US010541453B2

(12) United States Patent
Ho et al.

(10) Patent No.: US 10,541,453 B2
(45) Date of Patent: Jan. 21, 2020

(54) BATTERY MODULE FOR STARTING A POWER EQUIPMENT

(71) Applicant: GRST International Limited, Hong Kong (HK)

(72) Inventors: Kam Piu Ho, Hong Kong (HK); Ranshi Wang, Hong Kong (HK); Peihua Shen, Guangdong (CN)

(73) Assignee: GRST International Limited, Hong Kong (CN)

( * ) Notice: Subject to any disclaimer, the term of this patent is extended or adjusted under 35 U.S.C. 154(b) by 91 days.

(21) Appl. No.: 15/338,456

(22) Filed: Oct. 31, 2016

(65) Prior Publication Data

US 2018/0123187 A1    May 3, 2018

(51) Int. Cl.
| | |
|---|---|
| *H01M 10/46* | (2006.01) |
| *H01M 2/10* | (2006.01) |
| *H01M 4/131* | (2010.01) |
| *H01M 4/136* | (2010.01) |
| *H01M 4/505* | (2010.01) |

(Continued)

(52) U.S. Cl.
CPC ......... *H01M 10/46* (2013.01); *H01M 2/1077* (2013.01); *H01M 4/131* (2013.01); *H01M 4/136* (2013.01); *H01M 4/505* (2013.01); *H01M 4/587* (2013.01); *H01M 10/0525* (2013.01); *H01M 10/482* (2013.01); *H02J 7/0026* (2013.01); *H01M 4/485* (2013.01); *H01M 4/525* (2013.01); *H01M 10/486* (2013.01); *H01M 2200/10* (2013.01); *H01M 2220/20* (2013.01)

(58) Field of Classification Search
CPC .................................................. H01M 4/131

USPC .......................................................... 320/134
See application file for complete search history.

(56) References Cited

U.S. PATENT DOCUMENTS

| | | | | |
|---|---|---|---|---|
| 2013/0171340 | A1* | 7/2013 | Rojeski | ............... H01M 4/0402 427/122 |
| 2014/0087264 | A1* | 3/2014 | Li | ......................... H01M 4/366 429/224 |

(Continued)

FOREIGN PATENT DOCUMENTS

| | | |
|---|---|---|
| CN | 103427110 A | 12/2013 |
| CN | 105161768 A | 12/2015 |

(Continued)

OTHER PUBLICATIONS

International Search Report of PCT Patent Application No. PCT/CN2017/107583 dated Jan. 29, 2018.

*Primary Examiner* — Edward Tso
*Assistant Examiner* — Ahmed H Omar
(74) *Attorney, Agent, or Firm* — Squire Patton Boggs (US) LLP

(57) ABSTRACT

Provided herein is a battery module for starting the engines of outdoor power equipment such as automobiles, boats, trucks and tractors. The battery module disclosed herein has high performance at low temperature and has a maximum pulse discharging current measured at −30° C. of not less than 15% of the maximum pulse discharging current measured at 25° C. over a pulse discharge period of about 5 seconds. In addition, the battery module disclosed herein has a low self-discharging rate at both room temperature and high temperature. The capacity retention of the battery module is not less than 85% of its initial capacity after 7 months of room temperature storage.

20 Claims, 2 Drawing Sheets

(51) Int. Cl.
*H01M 4/587* (2010.01)
*H01M 10/0525* (2010.01)
*H01M 10/48* (2006.01)
*H02J 7/00* (2006.01)
*H01M 4/485* (2010.01)
*H01M 4/525* (2010.01)

(56) References Cited

U.S. PATENT DOCUMENTS

2015/0349308 A1* 12/2015 Hwang ............... H01M 2/1646
                                                                      429/144
2016/0233694 A1    8/2016 Koenen et al.
2018/0108937 A1* 4/2018 Drach ................. H01M 10/052

FOREIGN PATENT DOCUMENTS

| CN | 204406647 | * | 3/2016 | ............... B60L 11/18 |
|----|-----------|---|--------|---------------------------|
| CN | 205406647 U | | 7/2016 | |

* cited by examiner

BATTERY MODULE FOR STARTING A POWER EQUIPMENT

FIELD OF THE INVENTION

This invention relates to battery module and more particularly to a lithium-ion battery module for use in starting engines of automobiles, trucks, boats and other applications like generators and industrial and farm machinery such as industrial engines and tractor engines.

BACKGROUND OF THE INVENTION

Lithium-ion batteries (LIBs) have attracted extensive attention in the past two decades for a wide range of applications in portable electronic devices such as cellular phones and laptop computers. Due to rapid market development of electric vehicles (EV) and grid energy storage, high-performance, low-cost LIBs are currently offering one of the most promising options for large-scale and high power energy storage devices.

In general, a lithium ion battery includes a separator, a cathode and an anode. Currently, electrodes are prepared by dispersing fine powders of an active battery electrode material, a conductive agent, and a binder material in an appropriate solvent. The dispersion can be coated onto a current collector such as a copper or aluminum metal foil, and then dried at elevated temperature to remove the solvent. Sheets of the cathode and anode are subsequently stacked or rolled with the separator separating the cathode and anode to form a battery.

Depending on the power of the internal combustion engine of the outdoor power equipment, the required peak current may be several hundred amperes up to approximately 1000 A. Lead-acid batteries are widely used for starting the internal combustion engines of vehicles, trucks, buses and the like. However, such lead-acid batteries have an undesirably high self-discharge rate. When the starting batteries are not being used for a long period of time, the batteries become depleted and are unable to start the engine. This problem can be even more serious when lead-acid batteries are stored at high temperatures since the rate of self-discharge increases as the temperature goes up.

There is another problem that frequently occurs with lead-acid batteries. The battery may not be able to deliver sufficient power at low temperature. Additional concerns occur if there is an emergency situation for which it is critical to start an engine, such as for starting an emergency vehicle, or starting a snow blower. Furthermore, lead-acid batteries have disadvantages of heavy weight and risk of electrolyte leaking from the battery. Therefore, alternative starting batteries are being sought.

U.S. Patent Application No. 20160233694 A1 describes a lithium-ion battery pack for use to start an internal combustion engine. The battery pack comprises an outer housing; a plurality of battery cells enclosed in the outer housing; and a charging circuit enclosed in the outer housing and coupled to the plurality of battery cells, wherein the plurality of battery cells can be an NMC (nickel magnesium cobalt) battery and/or a lithium iron phosphate battery. However, the battery pack does not include any features that allow the battery pack to satisfy the power needs in various temperature environments such as extremely cold environments.

CN Patent Application No. 105161768 A describes a vehicle starting battery containing a cathode made of lithium iron phosphate ($LiFePO_4$). The starting battery includes at least four $LiFePO_4$ battery cells connected in parallel or in series. However, this starting battery may not work well in cold weather conditions because of deterioration of discharge performance of $LiFePO_4$ at low temperature, such as below about $-10°$ C.

CN Patent Application No. 103427110 A describes a vehicle starting battery containing a cathode made of lithium vanadium phosphate. The starting battery can be used in cold environments, such as $-40°$ C. However, there is no mention of the electrochemical performance of the starting battery except that under low temperature conditions. The lack of performance data limits us to gain a comprehensive understanding of such battery. In addition, the technology for large-scale production of lithium vanadium phosphate is not well proven, thereby offering considerable difficulty to commercial production. Furthermore, compared to cheaper materials like $LiMn_2O_4$ and $LiFePO_4$, the cathode material lithium vanadium phosphate has a disadvantage of relatively high cost.

In view of the above, there is always a need to develop more reliable devices for instantly providing power for starting the engines of outdoor power equipment such as automobiles, boats, trucks and tractors.

SUMMARY OF THE INVENTION

The aforementioned needs are met by various aspects and embodiments disclosed herein.

In one aspect, provided herein is a battery module comprising:
an outer housing;
a plurality of interconnected battery cells enclosed in the outer housing; and
a voltage regulating device coupled to each battery cell for regulating the charging and/or discharging voltage of each battery cell,
wherein the battery module has a maximum pulse discharging current measured at $-30°$ C. of not less than 15% of the maximum pulse discharging current measured at $25°$ C. over a pulse discharge period of about 5 seconds.

In another aspect, provided herein is a battery module comprising:
an outer housing;
a plurality of interconnected battery cells enclosed in the outer housing; and
a voltage regulating device coupled to each battery cell for regulating the charging and/or discharging voltage of each battery cell,
wherein the capacity retention of the battery module is not less than 50% of its initial capacity after storage for 7 days at $55°$ C.

In some embodiments, the battery cells are lithium-ion battery cells comprising at least one anode, at least one cathode and at least one separator interposed between the at least one anode and at least one cathode, and wherein the at least one anode comprises an anode current collector and an anode electrode layer comprising an anode material, a binder material and a conductive agent, and the at least one cathode comprises a cathode current collector and a cathode electrode layer comprising a cathode material, a binder material and a conductive agent.

In certain embodiments, the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, composites thereof, and combinations thereof, wherein each x is independently from 0.3 to 0.8; each y is independently from 0 to 0.45; and each z is independently from 0 to 0.2.

In some embodiments, the anode material is selected the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, each of the conductive agents in the cathode and anode electrode layers is independently selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

In some embodiments, each of the binder materials in the cathode and anode electrode layers is independently selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In further embodiments, the salt of alginic acid comprises a cation selected from Na, Li, K, Ca, $NH_4$, Mg, Al, or a combination thereof.

In certain embodiments, the at least one separator is a non-woven fabric made of polymeric fibers selected from the group consisting of polyolefin, polyethylene, high-density polyethylene, linear low-density polyethylene, low-density polyethylene, ultrahigh-molecular-weight polyethylene, polypropylene, polypropylene/polyethylene co-polymer, polybutylene, polypentene, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, polyester, polyethylene terephthalate, polybutylene terephthalate, polyethylene naphthalene, polybutylene naphthalate, and combinations thereof.

In some embodiments, the cathode material is lithium manganese oxide having a Li/Mn ratio equal to or greater than 0.5.

In certain embodiments, the battery module has a nominal operation voltage of about 12 V, about 24 V, about 36 V, or about 48 V.

In some embodiments, the battery module has a maximum charging rate greater than 2 C, greater than 3 C, greater than 4 C, or greater than 5 C at 25° C.

In certain embodiments, the battery module is capable of discharging continuously at a rate greater than 5 C, greater than 7.5 C, greater than 10 C, or greater than 15 C at 25° C.

In some embodiments, the battery module has a volumetric power density greater than or equal to 250 W/L, greater than or equal to 350 W/L, greater than or equal to 480 W/L, or greater than or equal to 950 W/L at 25° C.

In certain embodiments, the battery module has a maximum discharging rate greater than or equal to 10 C, greater than or equal to 15 C, greater than or equal to 30 C, or greater than or equal to 45 C for a pulse discharge period of about 5 seconds at 25° C.

In some embodiments, the capacity retention of the battery module is not less than 60% or not less than 70% of its initial capacity after storage for 7 days at 55° C.

In certain embodiments, the capacity retention of the battery module is not less than 80%, not less than 85%, or not less than 90% of its initial capacity after 7 months of room temperature storage.

In some embodiments, the plurality of interconnected battery cells comprises a negative electrical terminal comprising a first portion in electrical contact with the at least one anode of the plurality of interconnected battery cells and a second portion extending beyond the periphery of the outer housing and a positive electrical terminal comprising a first portion in electrical contact with the at least one cathode of the plurality of interconnected battery cells and a second portion extending beyond the periphery of the outer housing, wherein each of the negative and positive electrical terminals independently has a minimum cross-sectional area greater than or equal to 1 $cm^2$.

In certain embodiments, the battery module comprises a safety module comprising a temperature sensor connected to each battery cell.

In some embodiments, the battery cells are pouch battery cells. In certain embodiments, each battery cell has a capacity of not less than 8 Ah.

In certain embodiments, each battery cell comprises an electrode assembly, wherein the plurality of interconnected battery cells has a water content of less than 20 ppm by weight, based on the total weight of the dried electrode assembly.

DETAILED DESCRIPTION OF THE INVENTION

General Definitions

Figure 1:
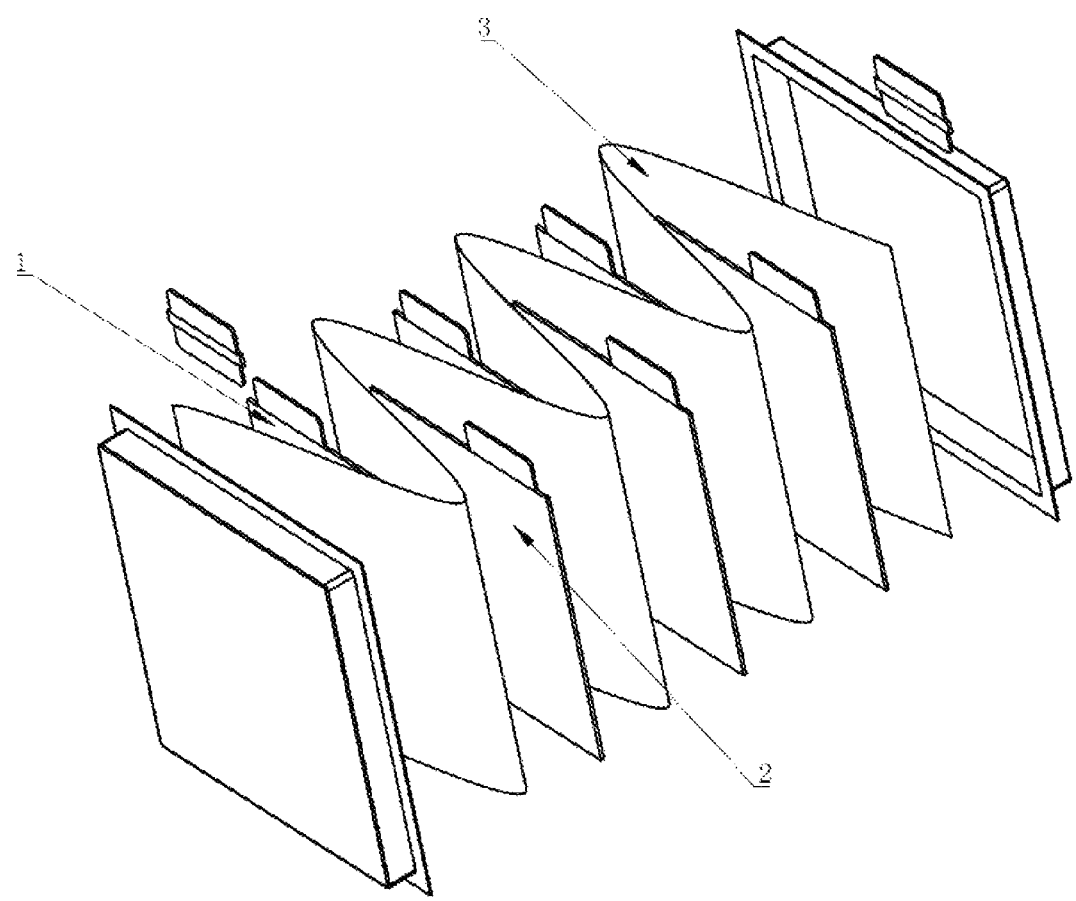
FIG. 1 is a schematic diagram for an electrode assembly in Example 1.

The term "electrode" refers to a "cathode" or an "anode."

The term "positive electrode" is used interchangeably with cathode. Likewise, the term "negative electrode" is used interchangeably with anode.

The term "binder material" refers to a chemical or a substance used to hold the active electrode material for example cathode or anode material and conductive agent in place.

The term "current collector" refers to a support for coating the active electrode material and a chemically inactive high electron conductor for keeping an electric current flowing to electrodes during discharging or charging a secondary battery.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or the full energy in 10 hours; and a 5 C means utilization of the full energy in 12 minutes.

The term "capacity" refers the total amount of electrical charge an electrochemical cell, such as a battery cell or a battery module, is able to hold. Capacity is usually expressed in units of ampere-hour (Ah).

The term "electrochemical cell" refers to a device that convert chemical energy into electrical energy or electrical energy into chemical energy. Some non-limiting examples of the electrochemical cells include primary batteries, secondary batteries, lithium batteries, and lithium-ion batteries, etc.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is $1/1,000$ of an ampere-hour.

The term "slurry" refers to a dispersion of solid materials in a solvent.

The term "applied" or "applying" refers to an act of laying or spreading a substance on a surface.

The term "doctor blading" refers to a process for fabrication of large area films on rigid or flexible substrates. A coating thickness can be controlled by an adjustable gap width between a coating blade and a coating surface, which allows the deposition of variable wet layer thicknesses.

The term "transfer coating" or "roll coating" refers to a process for fabrication of large area films on rigid or flexible substrates. A slurry is applied on the substrate by transferring a coating from the surface of a coating roller with pressure. A coating thickness can be controlled by an adjustable gap width between a metering blade and a surface of the coating roller, which allows the deposition of variable wet layer thicknesses. In a metering roll system, the thickness of the coating is controlled by adjusting the gap between a metering roller and a coating roller.

The term "battery cycle life" refers to the number of complete charge/discharge cycles a battery can perform before its nominal capacity falls below 80% of its initial rated capacity.

The term "discharging current" refers to the current at which an electrochemical cell is discharged. Discharging current can be expressed in units of amperes.

The term "maximum pulse discharging current" refers to the maximum current at which an electrochemical cell in a fully-charged state can be discharged at the nominal voltage such as equal to 12 V or 24 V or a voltage higher than the nominal voltage of the electrochemical cell over a short period of time, for example, 3 seconds, 5 seconds, or 10 seconds.

The term "maximum pulse discharging rate" refers to the maximum current rate that an electrochemical cell in a fully-charged state can be discharged at the nominal voltage such as equal to 12 V or 24 V or a voltage higher than the nominal voltage of the electrochemical cell over a short period of time, for example, 3 seconds, 5 seconds, or 10 seconds.

The term "continuous discharging rate" refers to the maximum rate that an electrochemical cell in a fully-charged state can be discharged at the nominal voltage such as equal to 12 V or 24 V or a voltage higher than the nominal voltage of the electrochemical cell.

The term "nominal voltage" refers to the (rated) voltage across the terminals of the cell when it is loaded, and specifically refers to the average voltage on the plateau of the cell's discharge curve.

The term "charging current" refers to the current applied to charge a battery to restore its available capacity.

The term "maximum charging rate" refers to the maximum current rate that an electrochemical cell in a fully discharged state is charged to reach the upper limit voltage of the electrochemical cell and a capacity of not less than 80% of the nominal capacity of the electrochemical cell.

The term "nominal capacity" refers to the maximum electrical charge that can theoretically be stored in a battery cell or a battery module.

The term "electrode assembly" refers to a structure comprising at least one positive electrode, at least one negative electrode, and at least one separator interposed between the positive electrode and the negative electrode.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Provided herein is a battery module comprising: an outer housing; a plurality of interconnected battery cells enclosed in the outer housing; and a voltage regulating device coupled to each battery cell for regulating the charging and/or discharging voltage of each battery cell, wherein the battery module has a maximum pulse discharging current measured at −30° C. of not less than 15% of the maximum pulse discharging current measured at 25° C. over a pulse discharge period of about 5 seconds.

In other embodiments, the maximum pulse discharging current of the battery module disclosed herein measured at −30° C. is not less than 17%, not less than 18%, not less than 19%, or not less than 20% of the maximum pulse discharging current measured at 25° C. over a pulse discharge period of about 5 seconds.

Currently, lead-acid batteries are still typically used as standard vehicle batteries and other power equipment. However, drawbacks of the lead-acid batteries include high self-discharge, poor performance in cold weather and significant degradation with age. Lithium-ion battery is now considered as a potential replacement for the lead-acid batteries for combustion engine starting application. So far, no prior art document describes a lithium-ion battery that has high performance at low temperature and a low self-discharging rate. The usability of lithium-ion batteries can be expanded if their allowable operation temperature range is extended.

In certain embodiments, the battery cells are lithium-ion battery cells comprising at least one anode, at least one cathode and at least one separator interposed between the at least one anode and at least one cathode, wherein the at least one anode comprises an anode current collector and an anode electrode layer comprising an anode material, a binder material and a conductive agent, and the at least one cathode comprises a cathode current collector and a cathode electrode layer comprising a cathode material, a binder material and a conductive agent.

In some embodiments, the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, and combinations thereof, wherein each x is independently from 0.3 to 0.8; each y is independently from 0.1 to 0.45; and each z is independently from 0 to 0.2. In certain embodiments, the cathode material is selected from the group consisting of $LiNi_xMn_yO_2$, $Li_{1+z}Ni_xMn_yCo_{1-x-y}O_2$, $LiMnO_2$, $LiMnO_2O_4$, and combinations thereof, wherein each x is independently from 0.4 to 0.6; each y is independently from 0.2 to 0.4; and each z is independently from 0 to 0.1. In some embodiments, the cathode material is $Li_{1+x}Mn_{2-y}O_4$, wherein each x is from 0 to 0.2; and each y is from 0 to 0.15. In certain embodiments, the cathode material is lithium manganese oxide having a Li/Mn ratio equal to or greater than 0.5. In other embodiments, the cathode material is not $LiCoO_2$, $LiNiO_2$, $LiV_2O_5$, $LiTiS_2$, $LiMoS_2$, $LiMnO_2$, $LiCrO_2$, or $LiMn_2O_4$. In further embodiments, the cathode material is not $LiNi_xMn_yO_2$, $Li_{1+z}Ni_xMn_yCo_{1-x-y}O_2$, or $LiNi_xCo_yAl_zO_2$, wherein each x is independently from 0.3 to 0.8; each y is independently from 0.1 to 0.45; and each z is independently from 0 to 0.2.

Among different cathode materials, lithium ternary transition metal oxides containing Ni, Mn, and Co have high capacity per unit weight. On the other hand, lithium manganese oxides such as $LiMnO_2$ and $LiMn_2O_4$ have an advantage of use of manganese which is abundant as a raw material and is a low-cost, safe alternative.

In general, the battery module for starting engine application is installed and kept in close proximity to the engine. Therefore, starter batteries must be able to operate at high temperatures. Lithium manganese oxides has the problem of capacity fade and poor cycling performance at elevated temperatures due to dissolution of manganese into the electrolyte. To suppress the capacity fade and improve cycling stability at elevated temperatures, the cathode material can be doped with a doping element.

In some embodiments, the cathode material comprises a doping element selected from the group consisting of Fe, Ni, Mn, Al, Mg, Zn, Ti, La, Ce, Sn, Zr, Ru, Si, Ge and combinations thereof. In certain embodiments, the cathode material is doped with at least one doping element selected from Fe, Ni, Mn, Al, Mg, Zn and Ti. In some embodiments, the cathode material is doped with at least one doping element selected from La, Ce, Sn, Zr, Ru, Si and Ge. In other embodiments, the doping element is not Fe, Ni, Mn, Al, Mg, Zn or Ti. In still other embodiments, the doping element is not La, Ce, Sn, Zr, Ru, Si or Ge. In some embodiments, the cathode material is doped with at least two different elements selected from Fe, Ni, Mn, Al, Mg, Zn, Ag, Cr, Co, Cu, Ti and Zr. In further embodiments, the cathode material is doped with at least two different elements selected from Fe, Ni, Mn, Al, Mg, Zn, and Ti.

In certain embodiments, the doping element is present in an amount from about 0.001% to about 2% by weight, based on the total weight of the cathode electrode layer. In some embodiments, the doping element is present in an amount from about 0.01% to about 2%, from about 0.1% to about 2%, from about 0.01% to about 1%, from about 0.1% to about 1%, or from about 0.1% to about 0.5% by weight, based on the total weight of the cathode electrode layer. In certain embodiments, the doping element is present in an amount less than 2%, less than 1%, less than 0.5%, less than 0.1%, or less than 0.01% by weight, based on the total weight of the cathode electrode layer.

Cathode materials having core-shell structure can also suppress the capacity fade at elevated temperatures. In some embodiments, the cathode material comprises or is a core-shell composite having a core and shell structure, wherein the core and the shell each independently comprise a lithium transition metal oxide selected from the group consisting of $LiCO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, and combinations thereof, wherein each x is independently from 0.3 to 0.8; each y is independently from 0.1 to 0.45; and each z is independently from 0 to 0.2. In other embodiments, the core and the shell each independently comprise two or more lithium transition metal oxides. The two or more lithium transition metal oxides in the core and the shell may be the same, or may be different or partially different. In some embodiments, the two or more lithium transition metal oxides are uniformly distributed over the core. In certain embodiments, the two or more lithium transition metal oxides are not uniformly distributed over the core.

In some embodiments, each of the lithium transition metal oxides in the core and the shell is independently doped with a doping element selected from the group consisting of Fe, Ni, Mn, Al, Mg, Zn, Ti, La, Ce, Sn, Zr, Ru, Si, Ge, and combinations thereof.

In certain embodiments, the diameter of the core is from about 5 μm to about 45 μm, from about 5 μm to about 35 μm, from about 5 μm to about 25 μm, from about 10 μm to about 40 μm, or from about 10 μm to about 35 μm. In certain embodiments, the thickness of the shell is from about 15 μm to about 45 μm, from about 15 μm to about 30 μm, from about 15 μm to about 25 μm, from about 20 μm to about 30 μm, or from about 20 μm to about 35 μm.

In some embodiments, the diameter or thickness ratio of the core and the shell is in the range of 15:85 to 85:15, 25:75 to 75:25, 30:70 to 70:30, or 40:60 to 60:40. In certain embodiments, the volume or weight ratio of the core and the shell is 80:20, 70:30, 60:40, 50:50, 40:60, or 30:70.

In certain embodiments, the cathode material has a particle size D50 from about 10 μm to about 50 μm, from about 10 μm to about 40 μm, from about 10 μm to about 30 μm, from about 15 μm to about 50 μm, from about 20 μm to about 50 μm, from about 25 μm to about 50 μm, from about 15 μm to about 40 μm, from about 20 μm to about 40 μm, or from about 25 μm to about 40 μm. Smaller cathode particle size gives the battery higher charging/discharging capability for shorter lithium ion transportation path in the cathode. However, larger cathode particle size helps to improve the battery stability at elevated temperature for the less reaction with electrolyte.

In some embodiments, the cathode material has a particle size D10 from about 3 μm to about 20 μm, from about 3 μm to about 10 μm, from about 3 μm to about 8 μm, from about 1 μm to about 10 μm, from about 1 μm to about 8 μm, from about 1 μm to about 5 μm, from about 2 μm to about 10 μm, from about 2 μm to about 5 μm, or from about 2 μm to about 8 μm.

In certain embodiments, the cathode material has a particle size D90 from about 20 μm to about 80 μm, from about 30 μm to about 80 μm, from about 40 μm to about 80 μm, from about 50 μm to about 80 μm, from about 30 μm to about 70 μm, from about 30 μm to about 60 μm, from about 20 μm to about 50 μm, from about 20 μm to about 60 μm, or from about 40 μm to about 60 μm.

The nature of the anode material influences the resulting voltage of the battery since the voltage is the difference between the half-cell potentials at the cathode and anode. In some embodiments, the anode material is selected from the group consisting of graphite, natural graphite particulate, synthetic graphite particulate, hard carbon, mesophase carbon, Sn (tin) particulate, $Li_4Ti_5O_{12}$ particulate, Si (silicon) particulate, Si—C composite particulate, and combinations thereof. In other embodiments, the anode material is not natural graphite particulate, synthetic graphite particulate, hard carbon, mesophase carbon, Sn (tin) particulate, $Li_4Ti_5O_{12}$ particulate, Si (silicon) particulate, or Si—C composite particulate.

In certain embodiments, the amount of each of the cathode and anode materials is independently at least 50%, at least 55%, at least 60%, at least 65%, at least 70%, at least 75%, at least 80%, at least 85%, at least 90%, or at least 95% by weight, based on the total weight of the cathode or anode electrode layer. In some embodiments, the amount of each of the cathode and anode materials is independently at most 50%, at most 55%, at most 60%, at most 65%, at most 70%, at most 75%, at most 80%, at most 85%, at most 90%, or at most 95% by weight, based on the total weight of the cathode or anode electrode layer.

In some embodiments, the amount of the cathode material is between 50% and 95%, between 70% and 95%, between 80% and 95%, between 70% and 92%, or between 75% and 90% by weight, based on the total weight of the cathode electrode layer.

Other components such as conductive agent and binder material in electrode layers will also affect the performance of lithium-ion batteries over time at different rates. The conductive agent in the electrode layers is for enhancing the electrically-conducting property of an electrode. In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

The binder material in the electrode layers performs a role of binding the active electrode material and conductive agent together on the current collector. In some embodiments, the binder material is selected from the group consisting of styrene-butadiene rubber (SBR), carboxymethyl cellulose (CMC), polyvinylidene fluoride (PVDF), acrylonitrile copolymer, polyacrylic acid (PAA), polyacrylonitrile, poly(vinylidene fluoride)-hexafluoropropene (PVDF-HFP), latex, a salt of alginic acid, and combinations thereof. In certain embodiments, the salt of alginic acid comprises a cation selected from Na, Li, K, Ca, $NH_4$, Mg, Al, or a combination thereof.

In some embodiments, the binder material is SBR, CMC, PAA, a salt of alginic acid, or a combination thereof. In certain embodiments, the binder material is acrylonitrile copolymer. In some embodiments, the binder material is polyacrylonitrile. In certain embodiments, the binder material is free of styrene-butadiene rubber (SBR), carboxymethyl cellulose (CMC), polyvinylidene fluoride (PVDF), acrylonitrile copolymer, polyacrylic acid (PAA), polyacrylonitrile, poly(vinylidene fluoride)-hexafluoropropene (PVDF-HFP), latex, or a salt of alginic acid.

In certain embodiments, the amount of each of the conductive agent and binder material in the cathode or anode electrode layer is independently at least 1%, at least 2%, at least 3%, at least 4%, at least 5%, at least 10%, at least 15%, at least 20%, at least 25%, at least 30%, at least 35%, at least 40%, at least 45%, or at least 50% by weight, based on the total weight of the cathode or anode electrode layer. In certain embodiments, the amount of each of the conductive agent and binder material in the cathode or anode electrode layer is independently at most 1%, at most 2%, at most 3%, at most 4%, at most 5%, at most 10%, at most 15%, at most 20%, at most 25%, at most 30%, at most 35%, at most 40%, at most 45%, or at most 50% by weight, based on the total weight of the cathode or anode electrode layer.

In some embodiments, the amount of the conductive agent in each of the cathode and anode electrode layers is independently from about 0.05 wt. % to about 0.5 wt. %, from about 0.1 wt. % to about 1 wt. %, from about 0.25 wt. % to about 2.5 wt. %, from about 0.5 wt. % to about 5 wt. %, from about 2 wt. % to about 5 wt. %, from about 3 wt. % to about 7 wt. %, or from about 5 wt. % to about 10 wt. %, based on the total weight of the cathode or anode electrode layer.

In certain embodiments, the amount of the binder material in each of the cathode and anode electrode layers is independently from about 1 wt. % to about 5 wt. %, from about 1.5 wt. % to about 3 wt. %, from about 2.5 wt. % to about 5 wt. %, from about 3.7 wt. % to about 7.5 wt. %, from about 5 wt. % to about 10 wt. %, from about 7.5 wt. % to about 12.5 wt. %, from about 10 wt. % to about 20 wt. %, or from about 17.5 wt. % to about 25 wt. %, based on the total weight of the cathode or anode electrode layer.

The current collector acts to collect electrons generated by electrochemical reactions of the active electrode material or to supply electrons required for the electrochemical reactions. In some embodiments, each of the current collectors of the positive and negative electrodes, which can be in the form of a foil, sheet or film, is independently stainless steel, titanium, nickel, aluminum, copper or electrically-conductive resin. In certain embodiments, the current collector of the positive electrode is an aluminum thin film. In some embodiments, the current collector of the negative electrode is a copper thin film.

In some embodiments, the current collector has a thickness from about 6 μm to about 30 μm since thickness will affect the volume occupied by the current collector within a battery and the amount of the active electrode material and hence the capacity in the battery.

A slurry can be applied on a current collector to form a coated film on the current collector. The solvent used in the slurry can be any polar organic solvent. Some non-limiting examples of the polar organic solvent include methyl propyl ketone, methyl isobutyl ketone, ethyl propyl ketone, diisobutyl ketone, acetophenone, N-methylpyrrolidone, acetone, tetrahydrofuran, dimethylformamide, acetonitrile, dimethyl sulfoxide, and the like.

An aqueous solvent can also be used for producing the slurry. Transition to an aqueous-based process may be desirable to reduce emissions of volatile organic compound, and increase processing efficiency. In certain embodiments, the solvent used in the slurry is a solution containing water as the major component and a volatile solvent, such as alcohols, lower aliphatic ketones, lower alkyl acetates or the like, as the minor component in addition to water. In some embodiments, the amount of water is at least 50%, at least 55%, at least 60%, at least 65%, at least 70%, at least 75%, at least 80%, at least 85%, at least 90%, or at least 95% to the total amount of water and solvents other than water. In certain embodiments, the amount of water is at most 55%, at most 60%, at most 65%, at most 70%, at most 75%, at most 80%, at most 85%, at most 90%, or at most 95% to the total amount of water and solvents other than water. In some embodiments, the solvent consists solely of water, that is, the proportion of water in the solvent is 100 vol. %.

Any water-miscible solvents can be used as the minor component. Some non-limiting examples of the minor component (i.e., solvents other than water) include alcohols, lower aliphatic ketones, lower alkyl acetates and combinations thereof. Some non-limiting examples of the alcohol include $C_1$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

After drying the coated electrode, the dried electrode can be pressed using calendering rolls, a press with a die or other suitable processing apparatus to compress the electrodes to a desired thickness. The rate of transport of lithium ions across the electrode thickness limits the power. When the electrode thickness is low, the lithium ion diffusion distance can be decreased for charge or discharge. In some embodiments, the thickness of each of the cathode and anode electrode layers is independently from about 1.0 μm to about 40 μm or from about 1.0 μm to about 25 μm.

The effective ionic conductivity in an electrode layer is believed to decrease rapidly with decreasing pore volume fraction, since the pores are filled with ion conducting electrolyte. Thus, it is important that the volume fraction of active material can be optimized without sacrificing the capacity. In certain embodiments, the density of each of the cathode and anode electrode layers on the current collector is independently from about 1.0 g/cm$^3$ to about 6.5 g/cm$^3$, from about 1.0 g/cm$^3$ to about 5.0 g/cm$^3$, from about 1.0 g/cm$^3$ to about 4.0 g/cm$^3$, from about 1.0 g/cm$^3$ to about 3.5 g/cm$^3$, from about 1.0 g/cm$^3$ to about 3.0 g/cm$^3$, from about 1.0 g/cm$^3$ to about 2.0 g/cm$^3$, from about 2.0 g/cm$^3$ to about 5.0 g/cm$^3$, from about 2.0 g/cm$^3$ to about 4.0 g/cm$^3$ from about 3.0 g/cm$^3$ to about 5.0 g/cm$^3$, or from about 3.0 g/cm$^3$ to about 6.0 g/cm$^3$. In some embodiments, the density of the cathode electrode layer on the current collector is from about 1.0 g/cm$^3$ to about 3.5 g/cm$^3$. Electrode layer having such a density introduces a desired porosity in the electrode, thereby promoting ion transport.

A battery can comprise a negative electrode, a positive electrode and a separator positioned between negative electrode and positive electrode. The separator must have electrical insulation property and be permeable to lithium ions to ensure the ion transport between the positive and the negative electrodes. In some embodiments, the separator may comprise woven or nonwoven polymeric fibers, natural fibers, carbon fibers, glass fibers or ceramic fibers. In certain embodiments, the separator comprises woven or nonwoven polymeric fibers.

In some embodiments, the fibers of the woven or nonwoven are made of polyolefin, polyethylene, high-density polyethylene, linear low-density polyethylene, low-density polyethylene, ultrahigh-molecular-weight polyethylene, polypropylene, polypropylene/polyethylene co-polymer, polybutylene, polypentene, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, polyester, polyethylene terephthalate, polybutylene terephthalate, polyethylene naphthalene, polybutylene naphthalate, or a combination thereof.

In certain embodiments, the separator has a melting point of 100° C. or higher, 120° C. or higher, 140° C. or higher, 160° C. or higher, 180° C. or higher, 200° C. or higher, or 250° C. or higher. The separator having high melting point shows high thermal stability.

In some embodiments, the separator has a thickness from about 1.0 μm to about 40 μm, or from about 1.0 μm to about 25 μm. Thinner separators allow an increased packing density in a battery pack since a larger amount of energy can be stored in the same volume.

In certain embodiments, the separator has an average pore size from about 1 nm to about 350 nm, from about 1 nm to about 100 nm, from about 20 nm to about 100 nm, from about 40 nm to about 350 nm, from about 40 nm to about 80 nm, from about 50 nm to about 80 nm, from about 0.1 μm to about 70 μm, from about 1 μm to about 60 μm, from about 1 μm to about 50 μm, from about 1 μm to about 40 μm, from about 1 μm to about 30 μm, from about 1 μm to about 20 μm, from about 1 μm to about 10 μm, from about 1 μm to about 5 μm, or from about 1 μm to about 3 μm. A separator having high average pore size can yield a battery with a good ion permeability.

The nonwoven fabric may be produced by a publicly known process. Some non-limiting examples of suitable process include dry process, spun bond process, water needle process, spun lace process, wet process, melt-blowing process and the like. In some embodiments, the separator is formed by a dry stretching process, a wet laid process, a dry laid process, or an electrospinning process. In other embodiments, the separator film is a porous multi-layered film.

The separator can be in a coated or uncoated form. In certain embodiments, the separator is coated and comprises a porous base material and a protective porous layer coated on one or both surfaces of the porous base material, wherein the protective porous layer comprises a binder material and an inorganic filler. In some embodiments, the inorganic filler is selected from the group consisting of $Al_2O_3$, $SiO_2$, $TiO_2$, $ZrO_2$, $BaO_x$, $ZnO$, $CaCO_3$, TiN, AlN, and combinations thereof, wherein x is 1 or 2. In certain embodiments, the separator is uncoated and does not comprise a protective porous layer.

An electrolyte comprising a dissolved lithium salt is added to the electrode assembly. Electrolyte in contact with the electrodes provides ionic conductivity through the separator between electrodes of opposite polarity. The electrode assembly and electrolyte are sealed within a suitable container.

In certain embodiments, the battery cell is a pouch battery cell. A pouch battery comprises a battery structure sealed within a pouch. Various containers are known in the art. In some embodiments, the container is an aluminum foil bag. The aluminum foil can provide appropriate form and mechanical strength to the pouch material. Generally, each side of the aluminum foil is covered with one or more polymer layers. When a flexible pouch is used as the container of a lithium battery, the thickness of the resulting battery is substantially reduced compared with using a can as the container. In addition, more electrodes can be contained in the same volume. This increases the power storage capacity of the battery. The battery can be easily manufactured in any desired shape due to the flexible nature of the container. Therefore, the pouch batteries can provide a compact design of a battery pack with high energy output. In other embodiments, the battery cell is a cylindrical battery cell.

To achieve the desired battery capacities, the batteries can be designed to include 10 to 100 positive electrode plates. In some embodiments, the number of the positive electrode plates in a pouch battery is from about 15 to about 80, from about 15 to about 60, from about 20 to about 70, from about 20 to about 50, from about 25 to about 60, from about 25 to about 50, or from about 20 to about 50. The positive and negative electrodes are stacked in an alternating pattern.

In some embodiments, the capacity of each battery cell in the battery module is from about 5 Ah to about 20 Ah, from about 5 Ah to about 15 Ah, from about 7.5 Ah to about 20 Ah, from about 7.5 Ah to about 15 Ah, from about 10 Ah to about 15 Ah, or from about 9 Ah to about 12 Ah. In certain embodiments, each battery cell has a capacity of not less than 5 Ah, not less than 8 Ah, not less than 10 Ah, or not less than 15 Ah.

Depending on the power of the internal combustion engine of the vehicle, the required peak current may be several hundred amperes up to approximately 1000 A. In order to realize such a high output property and a high current property, it is important to reduce an internal resistance of a battery as much as possible. The current collectors in the battery cell are electrically connected to conductive tabs that extend from the pouch. In some embodiments, a cutting process can be used to remove the unwanted portion of the current collector leaving a current collector tab in the desired location. In other embodiments, an electrode foil may be welded to the electrode to serve as a current collector tab. In certain embodiments, the conductive tabs may be attached to the uncoated portions of the positive and negative current collectors by welding. Some non-limiting examples of suitable welding methods include ultrasonic welding, laser welding and spot-welding. In some embodiments, the conductive tab for positive electrode may be formed of aluminum or an aluminum alloy, whereas the conductive tab for negative electrode may be formed of nickel or a nickel alloy. When the pouch is sealed, the conductive tabs can be used to connect the battery cell to an external circuit. It is preferred to have wider tabs for reducing resistance and allowing high current flow. In certain embodiments, the conductive tab has a width greater than 2 cm, greater than 2.5 cm, greater than 3 cm, greater than 3.5 cm, or greater than 4 cm. In other embodiments, the conductive tab has a width less than 7 cm, less than 6 cm, less than 5.5 cm, less than 5 cm, or less than 4.5 cm.

Since connection points between the conductive tabs and the uncoated portions of the positive and negative current collectors in pouch battery are numerous, the impedance to current flow through the tabs is reduced. Some designs of cylindrical battery have only one current collector tab for each of the cathode and anode. Having more current collectors tabs can lower cell impedance and improve overall cell performance. Because of this reason, the jelly roll preferably has one current collector tab per winding to reduce impedance. However, alignment of the current collector tabs in the rolled jelly roll has proven to be a difficult task since the roll itself must be precisely wound in order for the current collector tabs to align. Thus, the manufacturing process of cylindrical battery having multiple current collector tabs is expensive and complicated.

Water is one of the key factors needed to be strictly controlled in the production process of lithium-ion batteries. A battery with high water content may lead to serious attenuation of electrochemical performance and affect stability of battery.

An electrode assembly is dried before filing the electrolyte. In certain embodiments, the electrode assembly can be dried under vacuum at a temperature from about 70° C. to about 155° C. In some embodiments, the electrode assembly can be dried under vacuum at a temperature of about 80° C. or higher, about 90° C. or higher, about 100° C. or higher, about 110° C. or higher, about 120° C. or higher, or about 130° C. or higher. The electrode assembly of the present invention has a particularly low water content, contributing to reliable performance of the lithium-ion batteries. In some embodiments, the water content in the dried electrode assembly is from about 5 ppm to about 50 ppm, from about 5 ppm to about 40 ppm, from about 5 ppm to about 30 ppm, from about 5 ppm to about 20 ppm, from about 5 ppm to about 10 ppm, from about 3 ppm to about 30 ppm, from about 3 ppm to about 20 ppm, or from about 3 ppm to about 10 ppm by weight, based on the total weight of the dried electrode assembly.

In certain embodiments, the water content in the dried electrode assembly is less than 50 ppm, less than 40 ppm, less than 30 ppm, less than 20 ppm, less than 10 ppm, or less than 5 ppm by weight, based on the total weight of the dried electrode assembly. In some embodiments, the dried electrode assembly disclosed herein has a water concentration therein no greater than about 20 ppm by weight, based on the total weight of the dried electrode assembly.

Lithium-ion batteries should be able to be operated in a wide temperature range. The disability of lithium-ion batteries at low-temperature operations can be caused by the limited ionic transport properties of the electrolyte and sluggish Li+ desolvation. In some embodiments, the electrolyte is a non-aqueous organic solvent selected from a carbonate-based, ester-based, ether-based or other aprotic solvent. One reason for the successful operation over a wide temperature range lies in the basic properties of solvent, such as high ionic conductivity, low viscosity, low freezing point and high boiling point.

Some non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), ethyl methyl carbonate (EMC), ethylene carbonate (EC), propylene carbonate (PC), butylene carbonate (BC), methyl propyl carbonate (MC), and combinations thereof. Some non-limiting examples of the ester-based solvent include methyl acetate, methyl propanoate, ethyl acetate, n-propyl acetate, dimethylacetate, methyl propionate, ethyl propionate, and combinations thereof. Some non-limiting examples of the ether-based solvent include dibutyl ether, tetraglyme, diglyme, dimethoxyethane, 2-methyltetrahydrofuran, tetrahydrofuran and combinations thereof. Some non-limiting examples of the other aprotic solvent include methyl bromide, ethyl bromide, methyl formate, acetonitrile, dimethyl sulfoxide, dimethylformamide, N-methyl-pyrrolidone and combinations thereof. The non-aqueous organic solvent may be used singularly or in a mixture. When the organic solvent is used in a mixture, its mixture ratio can be controlled in accordance with desirable performance of a battery.

In some embodiments, the electrolyte composition comprises an electrolyte and a lithium salt dissolved therein. The lithium salt is dissolved in the non-aqueous organic solvent and supplies lithium ions in a rechargeable lithium battery. The electrolyte may comprise at least one lithium salt selected from the group consisting of $LiPF_6$, $LiBF_4$, $LiSbF_6$, LiAsF$_6$, LiClO$_4$, LiCl, LiI, LiB(C$_2$O$_4$)$_2$, LiSO$_3$CF$_3$, LiN(SO$_2$CF$_3$)$_2$, LiN(SO$_2$CF$_2$CF$_3$)$_2$, LiC$_4$F$_9$SO$_3$, or combinations thereof. The lithium salt may be used in a concentration of about 0.1 M to about 2.0 M. More severe temperature conditions, for example −30° C., can be managed by the electrolyte composition due to freezing point depression caused by lithium salt in the electrolyte.

In certain embodiments, the electrolyte composition further comprises one or more of the following additives: vinylene carbonate, diethylstilbestrol, butanesultone, dimethyl sulfide, and the like. In some embodiments, the total amount of the additives is from 0.1% to 10%, from 0.1% to 8%, from 0.1% to 6%, from 0.1% to 5%, from 0.1% to 4%, from 0.1% to 3%, from 0.1% to 2%, or from 0.1% to 1% by weight, based on the total weight of the electrolyte. The one or more additives can be used for protecting an electrode surface under conditions of high current operation by forming some protection layers on the electrode surface.

The battery module comprises a plurality of battery cells electrically connected to each other. Connection of the battery cells is not particularly restricted so long as the battery cells are connected to have a structure that is capable of providing a high output, a large capacity and a high voltage. The battery cells may be connected in parallel, in series, or in parallel and series to each other depending on voltage and storage capacity requirements. In some embodiments, the battery cells are connected in a series configuration. In other embodiments, the battery cells are connected in a parallel configuration. In still other embodiments, the battery cells are connected in a series-parallel configuration.

A load can require both voltage and current more than that of an individual battery cell. For achieving the required load voltage and current, the desired numbers of battery cells can be combined in a series-parallel configuration. The number of the battery cells is not particularly restricted. For example, the number of the battery cells may be 2 to 20.

The number of cells which are connected in series is determined by the voltage requirement of the loads. In some embodiments, the battery module comprises 3-15 battery cells connected in series with each other. In certain embodiments, the number of cells connected in series is 3, 4, 5, 6, 7, 8, 9, 10, 11, 12, 13, 14, 15 or more. In certain embodiments, the open circuit voltage of the battery module in fully charged state is about 12 V, about 24 V, about 36 V, or about 48 V.

The number of cells which are connected in parallel is determined by the continuous rate of discharge and by the total ampere hours required for a given continuous period of operation. In some embodiments, the battery module comprises 2-5 battery cells connected in parallel with each other. In certain embodiments, the number of cells connected in parallel is 2, 3, 4, 5 or more.

A voltage regulating device is coupled to each battery cell for regulating the charging and/or discharging voltage of each battery cell in a predefined voltage level. In certain embodiments, the voltage regulating device is also enclosed in the outer housing. In some embodiments, the plurality of interconnected battery cells has a nominal operation voltage of about 12 V, about 24 V, about 36 V, or about 48 V.

The operating current of the voltage regulating device ranges from 200 A to 600 A. In some embodiments, operating current of the voltage regulating device is higher than 200 A, higher than 300 A, higher than 400 A, higher than 500 A, or higher than 600 A.

In some embodiments, the plurality of interconnected battery cells comprises a safety module comprising a temperature sensor connected to each battery cell. The safety module monitors the temperature of each battery cell. When the monitored temperature of a battery cell reaches a threshold temperature, say 80° C., the battery protection circuit will prevent current flow to or from the battery, with the goal of preventing the battery module from overheating.

The plurality of interconnected battery cells comprises a negative electrical terminal comprising a first portion in electrical contact with the at least one anode of the plurality of interconnected battery cells and a second portion extending beyond the periphery of the outer housing and a positive electrical terminal comprising a first portion in electrical contact with the at least one cathode of the plurality of interconnected battery cells and a second portion extending beyond the periphery of the outer housing. It would be advantageous that the negative and positive electrical terminals can withstand high current loads and ensure reliable contacts between terminals of the battery module and an external circuit. That is, in order to obtain such a terminal that can withstand high current, materials with low resistivity and higher conductivity are preferred. Suitable materials for this purpose include copper, brass, aluminum, stainless steel, alloys thereof, or other similar highly conductive, low resistance materials.

Generally, the electrical terminal is of cylindrical shape and has a flat top. The cylindrical wall of the terminal has sufficient circumference and depth to contain a battery clamp. In some embodiments, the terminals have a screw thread for interconnection fixing. In certain embodiments, the electrical terminal has a cross-sectional area greater than or equal to 1 cm$^2$, greater than or equal to 2 cm$^2$, greater than or equal to 3 cm$^2$, greater than or equal to 4 cm$^2$, greater than or equal to 5 cm$^2$, greater than or equal to 6 cm$^2$, or greater than or equal to 7.5 cm$^2$, or greater than or equal to 9 cm$^2$. In other embodiments, the electrical terminal has a polygonal cross section having four or more sides, for example a rectangular, pentagonal, hexagonal or octagonal shape.

So far, there have been limited efforts to enhance the low-temperature operation of lithium-ion batteries. The battery module disclosed herein has good room temperature and low temperature discharge characteristics. In certain embodiments, the battery module is capable of discharging continuously at a rate greater than 5 C, greater than 7.5 C, greater than 10 C, greater than 12.5 C, greater than 15 C, or greater than 20 C at 25° C.

In some embodiments, the battery module has a maximum discharging rate greater than or equal to 10 C, greater than or equal to 15 C, greater than or equal to 30 C, or greater than or equal to 45 C for a pulse discharge period of about 5 seconds at 25° C.

When starting the engine at low temperatures, the starter draws large amounts of current from the battery module. The battery module disclosed herein is capable of discharging at high rate at low temperatures. In certain embodiments, the battery module is capable of discharging continuously at a rate greater than 2 C, greater than 4 C, or greater than 6 C at −20° C. In some embodiments, the battery module is capable of discharging continuously at a rate greater than 1 C, greater than 2 C, or greater than 3 C at −30° C.

In other embodiments, the battery module has a maximum discharging rate greater than 4 C, greater than 6 C, greater than 8 C, or greater than 10 C for a pulse discharge period of about 5 seconds at −20° C. In still other embodiments, the battery module has a maximum discharging rate greater than 1 C, greater than 3 C, greater than 5 C, or greater than 7 C for a pulse discharge period of about 5 seconds at −30° C.

In some embodiments, the battery module has a maximum charging rate greater than 2 C, greater than 3 C, greater than 4 C, or greater than 5 C at 25° C. In certain embodiments, the battery module has a maximum charging rate greater than 1 C, greater than 2 C, greater than 3 C, or greater than 4 C at −20° C. In some embodiments, the battery module has a maximum charging rate greater than 0.25 C, greater than 0.5 C, greater than 1 C, or greater than 2 C at −30° C.

In certain embodiments, each battery cell has a capacity of not less than 5 Ah, not less than 8 Ah, not less than 10 Ah, or not less than 15 Ah.

The present invention is designed for long cycle life and low temperature charge/discharge applications and directed to a starting system for an internal combustion engine of outdoor power equipment, such as but not limited to a lawn tractor, snow blower or other similar type of equipment.

The capacity retention of a battery module varies with storage time and storage temperature and will drop rapidly after a long period of non-use. The capacity retention of the battery module disclosed herein remains relatively constant over a long period of time. In some embodiments, the capacity retention of the battery module is not less than 80%, not less than 85%, or not less than 90% of its initial capacity after 7 months of room temperature storage.

If a battery is stored at high temperatures, the self-discharge will be accelerated. The battery module disclosed herein shows good capacity retention that maintains more than 50% of the initial capacity after 1 week storage at an elevated temperature. In some embodiments, the capacity retention of the battery module is not less than 50%, not less than 60%, or not less than 70% of its initial capacity after storage for 7 days at 55° C.

Starting an internal combustion engine usually requires a high current and therefore a high power. In certain embodiments, the battery module disclosed herein has a volumetric power density greater than or equal to 250 W/L, greater than or equal to 350 W/L, greater than or equal to 480 W/L, or greater than or equal to 950 W/L at 25° C.

In another aspect, provided herein is a battery module comprising: an outer housing; a plurality of interconnected battery cells enclosed in the outer housing; and a voltage regulating device coupled to each battery cell for regulating the charging and/or discharging voltage of each battery cell, wherein the capacity retention of the battery module is not less than 50%, not less than 60%, or not less than 70% of its initial capacity after storage for 7 days at 55° C.

In certain embodiments, each battery cell has a capacity of not less than 5 Ah, not less than 8 Ah, not less than 10 Ah, or not less than 15 Ah.

In some embodiments, the capacity retention of the battery module is not less than 80%, not less than 85%, or not less than 90% of its initial capacity after 7 months of room temperature storage.

Provided herein is a battery module comprising: an outer housing; a plurality of interconnected battery cells enclosed in the outer housing; and a voltage regulating device coupled to each battery cell for regulating the charging and/or discharging voltage of each battery cell, wherein the battery module has a maximum discharging rate greater than or equal to 10 C, greater than or equal to 15 C, or greater than or equal to 20 C for a pulse discharge period of about 5 seconds at 25° C.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Example 1

A) Preparation of Positive Electrode

A positive electrode slurry was prepared by mixing 92 wt. % cathode material ($LiMn_2O_4$ obtained from HuaGuan HengYuan LiTech Co. Ltd., Qingdao, China), 4 wt. % carbon black (SuperP; obtained from Timcal Ltd, Bodio, Switzerland) as a conductive agent, and 4 wt. % polyvinylidene fluoride (PVDF; Solef® 5130, obtained from Solvay S.A., Belgium) as a binder, which were dispersed in N-methyl-2-pyrrolidone (NMP; purity of ≥99%, Sigma-Aldrich, USA) to form a slurry with a solid content of 50 wt. %. The slurry was homogenized by a planetary stirring mixer.

The homogenized slurry was coated onto both sides of an aluminum foil having a thickness of 20 μm using a transfer coater with an area density of about 40 mg/cm². The coated films on the aluminum foil were dried for 6 minutes by a 24-meter-long conveyor hot air drying oven as a sub-module of the transfer coater operated at a conveyor speed of about 4 meter/minute to obtain a positive electrode. The temperature-programmed oven allowed a controllable temperature gradient in which the temperature gradually rose from the inlet temperature of 65° C. to the outlet temperature of 80° C. The electrode was then pressed to increase the density of the coating and the density was 2.98 g/cm³.

B) Preparation of Negative Electrode

A negative electrode slurry was prepared by mixing 90 wt. % of hard carbon (HC; purity of 99.5%, obtained from Ruifute Technology Ltd., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent, which were dispersed in deionized water to form another slurry with a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minutes by a 24-meter-long conveyor hot air dryer operated at a conveyor speed of about 10 meter/minute to obtain a negative electrode. The electrode was then pressed to increase the density of the coating and the density was 1.8 g/cm³.

C) Assembling of Electrode Assembly

The resulting cathode film and anode film were used to prepare the cathode and anode respectively by cutting into individual electrode plates. A conductive tab made of aluminum having a width of 3 cm, a length of 2 cm, and a thickness of 0.5 mm was ultrasonically welded to the uncoated portion of the positive electrode. Similarly, a conductive tab made of nickel having the same size as the conductive tab for the positive electrode was ultrasonically welded to the uncoated portion of the negative electrode. The above positive and negative electrode plates were alternately stacked via separators. As shown in FIG. 1, the positive electrode plates (1) (20 sheets), the negative electrode plates (2) (21 sheets), and the continuous separator sheet (3) were stacked to construct an electrode assembly. The separator was a ceramic coated microporous membrane made of nonwoven fabric (SEPARION, Evonik Industries, Germany), which had a thickness of about 35 μm. The electrode assembly was dried in a vacuum oven inside a glove box under a pressure of 10×10³ Pa at 102° C. for 3 hours. The drying chamber was then filled with hot, dry nitrogen having a water content of 5 ppm and a temperature of 85° C. The hot, dry air was retained in the drying chamber for 5 minutes before evacuating the drying chamber. This cycle was repeated 10 times.

D) Assembling of Pouch-type Battery

Pouch cells were assembled by packaging the dried electrode assembly in a case made of an aluminum-plastic laminated film. An electrolyte was then filled into the case holding the packed electrodes in high-purity argon atmosphere with moisture and oxygen content <1 ppm. The electrolyte was prepared by adding $LiPF_6$ in a solvent mixture of ethylene carbonate (EC), ethyl methyl carbonate (EMC) and dimethyl carbonate (DMC) in a volume ratio of 1:1:1 and adding vinylene carbonate as an additive, where the concentration of $LiPF_6$ was 1.0 M. The added amount of vinylene carbonate was 1.5% by weight, based on total weight of the electrolyte. After electrolyte filling, the pouch cells were vacuum sealed and then mechanically pressed using a punch tooling with standard square shape.

The cells were tested galvanostatically at a current density of C/2 at 25° C. on a battery tester (BTS-5V20A, obtained from Neware Electronics Co. Ltd, China) between 3.0 V and 4.2 V. The average nominal capacity was about 9.6 Ah.

E) Assembling of Battery Module

Figure 2:
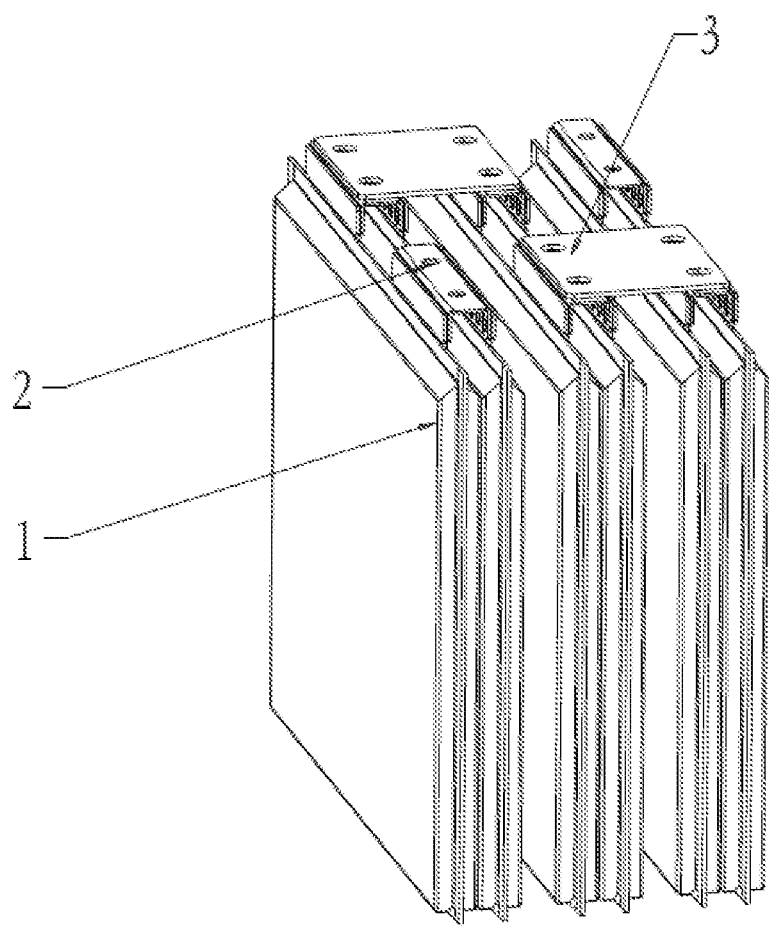
FIG. 2 is a schematic diagram for a series-parallel connection of battery cells in Example 1.

A battery module was made up of 6 pouch cells and the cells were connected in series/parallel configuration as shown in FIG. 2. Three groups of cells, each group containing two pouch cells (1) connected in parallel (2), were connected in series (3) between a plus voltage output terminal and a minus voltage output terminal. The middle group of cells is connected in parallel on the underside of the cells and the connection is not shown in FIG. 2. The interconnected battery cells were enclosed in a plastic housing, wherein the housing had a negative and a positive terminal protruding from said housing and exposed to the external environment. The cross-sectional area of each terminal was about 1.7 cm². The nominal voltage of the battery module was 12 V.

Example 2

Electrochemical Measurements

I) Nominal Capacity

The battery module prepared in Example 1 was tested at a current density of C/2 at 25° C. on a battery tester (CT-4001-15V300A-NA, obtained from Neware Electronics Co. Ltd, China) between 9.0 V and 12.6 V. The nominal capacity was about 19.8 Ah.

II) Charging Capability at Room Temperature

The battery module was first fully charged to 12.6 V and then discharged to 9.0 V at C/2 at 25° C. The fully discharged battery module was charged to 12.6 V at a predetermined current density and its discharging capacity was measured using a battery tester at C/2 at 25° C. This procedure was repeated by charging the fully discharged battery module with various charging current densities until the maximum charging rate was identified. The maximum charging rate obtained was about 3.8 C.

III) Discharging Capability at Room Temperature

The determination of the discharging capacities of the battery module was carried out by comparing the discharging curves obtained by discharging the battery module at different current densities. The battery module was first fully discharged and then charged to 12.6 V at C/2 at 25° C. The fully charged battery module was discharged to 9.0 V at a predetermined current density at 25° C. and its discharging capacity was measured using a battery tester. This procedure was repeated by discharging the fully charged battery module with various discharging current density until the continuous discharging rate and maximum pulse discharging rate were identified.

The continuous discharging rate of the battery module was 11.5 C. The maximum discharging rate of the battery module for a pulse discharge period of about 5 seconds was about 35 C. The volume of the battery module was about 3.5 L and the corresponding volumetric power density was about 780 W/L.

IV) Low Temperature Discharging Capability

The battery module was fully charged at C/2 at 25° C. The battery module was then placed in a temperature chamber (T-HWS-150U, Tianyi Instrument and Equipment Co. Ltd., Dongguan, China) and kept at −30° C. for 24 hours. The maximum discharging rate of the battery module was measured by discharging the module at different current densities to 9.0 V at −30° C. for a pulse discharge period of about 5 seconds using a battery tester (CT-4001-15V300A-NA, obtained from Neware Electronics Co. Ltd, China). The maximum discharging rate obtained was 7 C (~138 A). The battery module disclosed herein shows significantly enhanced discharge characteristics at −30° C. and demonstrates sufficient power for starting an engine of the outdoor power equipment after low temperature storage. In addition, the rate capability and cyclability of the battery module at room temperature are not sacrificed.

V) Capacity Fading in Storage

The battery module was fully charged at C/2 at 25° C. The battery module was then placed in a temperature chamber (T-HWS-150U, Tianyi Instrument and Equipment Co. Ltd., Dongguan, China) and kept at 55° C. for 7 days. A 40% relative humidity was maintained in the chamber. Then the battery module was cooled down to about 25° C. and discharged to 9.0 V at C/2. The capacity was about 16 Ah and the capacity retention was about 81% of its initial capacity after storage for 7 days at 55° C. The battery module disclosed herein demonstrates sufficient power for starting an engine of the outdoor power equipment after high temperature storage.

The battery module was fully charged at C/2 at 25° C. The battery module was then placed in a temperature chamber and kept at 25° C. for 7 months. A 40% relative humidity was maintained in the chamber. Then the battery module was discharged to 9.0 V at C/2. The capacity was about 17.4 Ah and the capacity retention was about 87% of its initial capacity after storage for 7 months at 25° C. The battery module disclosed herein demonstrates sufficient power for starting an engine of the outdoor power equipment after a long period of non-use.

Example 3

A) Preparation of Positive Electrode

A positive electrode slurry was prepared by mixing 65 wt. % $LiMn_2O_4$ (obtained from HuaGuan HengYuan LiTech Co. Ltd., Qingdao, China) and 25% $LiNi_{0.33}Mn_{0.33}Co_{0.33}O_2$ (TLM 310, obtained from Xinxiang Tianli Energy Co. Ltd., China) as a cathode material, 5.5 wt. % carbon black (SuperP; obtained from Timcal Ltd, Bodio, Switzerland) as a conductive agent, and 1.5 wt. % polyacrylic acid (PAA, #181285, obtained from Sigma-Aldrich, US) and 3 wt. % polyacrylonitrile (LA 132, Chengdu Indigo Power Sources Co., Ltd., China) as a binder, which were dispersed in deionized water to form a slurry with a solid content of 50 wt. %. The slurry was homogenized by a planetary stirring mixer.

The homogenized slurry was coated onto both sides of an aluminum foil having a thickness of 20 μm using a transfer coater with an area density of about 40 mg/cm². The coated films on the aluminum foil were dried for 4 minutes by a 24-meter-long conveyor hot air drying oven as a sub-module of the transfer coater operated at a conveyor speed of about 4 meter/minute to obtain a positive electrode. The temperature-programmed oven allowed a controllable temperature gradient in which the temperature gradually rose from the inlet temperature of 65° C. to the outlet temperature of 80° C. The electrode was then pressed to increase the density of the coating and the density was 3.05 g/cm³.

B) Preparation of Negative Electrode

A negative electrode slurry was prepared by mixing 90 wt. % of natural graphite (918-H, obtained from BTR New Energy Materials Inc., Shenzhen, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent, which were dispersed in deionized water to form another slurry with a solid content of 50 wt. %. The slurry was coated onto both sides of a copper foil having a thickness of 9 μm using a transfer coater with an area density of about 15 mg/cm². The coated films on the copper foil were dried at about 50° C. for 2.6 minutes by a 24-meter-long conveyor hot air dryer operated at a conveyor speed of about 10 meter/minute to obtain a negative electrode. The electrode was then pressed to increase the density of the coating and the density was 1.9 g/cm³.

C) Assembling of Electrode Assembly

The resulting cathode film and anode film were used to prepare the cathode and anode respectively by cutting into individual electrode plates. A conductive tab made of aluminum having a width of 4 cm, a length of 2 cm, and a thickness of 0.5 mm was ultrasonically welded to the uncoated portion of the positive electrode. Similarly, a conductive tab made of nickel having the same size as the conductive tab for the positive electrode was ultrasonically welded to the uncoated portion of the negative electrode. The above positive and negative electrode plates were alternately stacked via separators. The positive electrode plates (20 sheets), the negative electrode plates (21 sheets), and the continuous separator sheet were stacked to construct an electrode assembly. The separator was an uncoated nonwoven PET fabric (obtained from MITSUBISHI PAPER MILLS LTD, Japan), which had a thickness of about 20 μm. The electrode assembly was dried in a vacuum oven inside a glove box under a pressure of 10×10³ Pa at 100° C. for 3 hours. The drying chamber was then filled with hot, dry nitrogen having a water content of 5 ppm and a temperature of 85° C. The hot, dry air was retained in the drying chamber for 5 minutes before evacuating the drying chamber. This cycle was repeated 10 times.

D) Assembling of Pouch-type Battery

Pouch cells were assembled by packaging the dried electrode assembly in a case made of an aluminum-plastic laminated film. An electrolyte was then filled into the case holding the packed electrodes in high-purity argon atmosphere with moisture and oxygen content <1 ppm. The electrolyte was prepared by adding $LiPF_6$ in a solvent mixture of ethylene carbonate (EC), ethyl methyl carbonate (EMC) and dimethyl carbonate (DMC) in a volume ratio of 1:1:1 and adding diethylstilbestrol as an additive, where the concentration of $LiPF_6$ was 1.0 M. The added amount of diethylstilbestrol was 0.5% by weight, based on total weight of the electrolyte. After electrolyte filling, the pouch cells were vacuum sealed and then mechanically pressed using a punch tooling with standard square shape.

The cells were tested galvanostatically at a current density of C/2 at 25° C. on a battery tester (BTS-5V20A, obtained from Neware Electronics Co. Ltd, China) between 3.0 V and 4.2 V. The average nominal capacity was about 10.8 Ah.

E) Assembling of Battery Module

A battery module was made up of 7 pouch cells connected in series. The interconnected battery cells were enclosed in a plastic housing, wherein the housing had a negative and a positive terminal protruding from said housing and exposed to the external environment. The cross-sectional area of each terminal was about 1.2 cm². The nominal voltage of the battery module was 24 V.

Example 4

Electrochemical Measurements

I) Nominal Capacity

The battery module prepared in Example 3 was tested at current density of C/2 at 25° C. on a battery tester (CT-4001-30V200A-NA, obtained from Neware Electronics Co. Ltd, China) between 21 V and 29.4 V. The nominal capacity was about 10.8 Ah.

II) Charging Capability at Room Temperature

The battery module was first fully charged to 29.4 V and then discharged to 21 V at C/2 at 25° C. The fully discharged battery module was charged to 29.4 V at a predetermined current density and its discharging capacity was measured using a battery tester at C/2 at 25° C. This procedure was repeated by charging the fully discharged battery module with various charging current densities until the maximum charging rate was identified. The maximum charging rate obtained was about 4.5 C.

III) Discharging Capability at Room Temperature

The determination of the discharging capacities of the battery module was carried out by comparing the discharging curves obtained by discharging the battery module at different current densities. The battery module was first fully discharged and then charged to 29.4 V at C/2 at 25° C. The fully charged battery module was discharged to 21 V at a predetermined current density at 25° C. and its discharging capacity was measured using a battery tester. This procedure was repeated by discharging the fully charged battery module with various discharging current density until the continuous discharging rate and maximum pulse discharging rate were identified.

The continuous discharging rate of the battery module was 13.7 C. The maximum discharging rate of the battery module for a pulse discharge period of about 5 seconds was about 28.5 C. The volume of the battery module was about 3.5 L and the corresponding volumetric power density was about 1,015 W/L.

IV) Low Temperature Discharging Capability

The battery module was fully charged at C/2 at 25° C. The battery module was then placed in a temperature chamber (T-HWS-150U, Tianyi Instrument and Equipment Co. Ltd., Dongguan, China) and kept at −30° C. for 24 hours. The maximum discharging rate of the battery module was measured by discharging the module at different current densities to 21 V at −30° C. for a pulse discharge period of about 5 seconds using a battery tester (CT-4001-15V300A-NA, obtained from Neware Electronics Co. Ltd, China). The maximum discharging rate obtained was 5.4 C (~58.3 A).

The battery module disclosed herein shows significantly enhanced discharge characteristics at −30° C. and demonstrates sufficient power for starting an engine of the outdoor power equipment after low temperature storage. In addition, the rate capability and cyclability of the battery module at room temperature are not sacrificed.

V) Capacity Fading in Storage

The battery module was fully charged at C/2 at 25° C. The battery module was then placed in a temperature chamber (T-HWS-150U, Tianyi Instrument and Equipment Co. Ltd., Dongguan, China) and kept at 55° C. for 7 days. A 40% relative humidity was maintained in the chamber. Then the battery module was cooled down to about 25° C. and discharged at C/2 to a voltage of 21 V. The capacity was about 7.35 Ah and the capacity retention was about 68% of its initial capacity after storage for 7 days at 55° C. The battery module disclosed herein demonstrates sufficient power for starting an engine of the outdoor power equipment after high temperature storage.

Example 5

A) Preparation of Cathode Material

A particulate cathode material Mg-doped spinel lithium manganese oxide was prepared by mixing powdery $LiMn_2O_4$ (obtained from HuaGuan HengYuan LiTech Co. Ltd., Qingdao, China), $Li_2CO_3$ (obtained from Tianqi Lithium, Shenzhen, China) and MgO (>99%, obtained from Sigma-Aldrich, US), and calcining the obtained mixture for 18 hours at 900° C. The mixing ratio of the $LiMn_2O_4$, $Li_2CO_3$ and MgO may vary according to the desired amount of doping. The calcinated product was crushed by a jet mill (LNJ-6A, obtained from Mianyang Liuneng Powder Equipment Co., Ltd., Sichuan, China) for about 1 hour, followed by passing the crushed product through a 270-mesh sieve to obtain a cathode material doped with about 2.5 wt. % Mg. The cathode material obtained has a particle size D50 of about 40 μm.

B) Preparation of Positive Electrode

A positive electrode slurry was prepared by mixing 88 wt. % Mg-doped $LiMn_2O_4$ as a cathode material, 6 wt. % carbon black (SuperP; obtained from Timcal Ltd, Bodio, Switzerland) as a conductive agent, and 3 wt. % polyacrylic acid (PAA, #181285, obtained from Sigma-Aldrich, US) and 3 wt. % polyacrylonitrile (LA 132, Chengdu Indigo Power Sources Co., Ltd., China) as a binder, which were dispersed in deionized water to form a slurry with a solid content of 50 wt. %. The slurry was homogenized by a planetary stirring mixer.

The homogenized slurry was coated onto both sides of an aluminum foil having a thickness of 20 μm using a transfer coater with an area density of about 40 mg/cm$^2$. The coated films on the aluminum foil were dried for 4 minutes by a 24-meter-long conveyor hot air drying oven as a sub-module of the transfer coater operated at a conveyor speed of about 4.5 meter/minute to obtain a positive electrode. The temperature-programmed oven allowed a controllable temperature gradient in which the temperature gradually rose from the inlet temperature of 65° C. to the outlet temperature of 80° C. The electrode was then pressed to increase the density of the coating and the density was 3.15 g/cm$^3$.

C) Preparation of Negative Electrode

A negative electrode slurry was prepared by mixing 90 wt. % of hard carbon (HC; purity of 99.5%, obtained from Ruifute Technology Ltd., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent, which were dispersed in deionized water to form another slurry with a solid content of 50 wt. %. The slurry was coated onto both sides of a copper foil having a thickness of 9 μm using a transfer coater with an area density of about 15 mg/cm$^2$. The coated films on the copper foil were dried at about 50° C. for 2.4 minutes by a 24-meter-long conveyor hot air dryer operated at a conveyor speed of about 10 meter/minute to obtain a negative electrode. The electrode was then pressed to increase the density of the coating and the density was 1.8 g/cm$^3$.

D) Assembling of Electrode Assembly

The resulting cathode film and anode film were used to prepare the cathode and anode respectively by cutting into individual electrode plates. A conductive tab made of aluminum having a width of 4.5 cm, a length of 2 cm, and a thickness of 0.5 mm was ultrasonically welded to the uncoated portion of the positive electrode. Similarly, a conductive tab made of nickel having the same size as the conductive tab for the positive electrode was ultrasonically welded to the uncoated portion of the negative electrode. The above positive and negative electrode plates were alternately stacked via separators. The positive electrode plates (28 sheets), the negative electrode plates (29 sheets), and the continuous separator sheet were stacked to construct an electrode assembly. The separator was a ceramic coated PET microporous separator (obtained from MITSUBISHI PAPER MILLS LTD, Japan), which had a thickness of about 30 μm. The electrode assembly was dried in a vacuum oven inside a glove box under a pressure of 10×10$^3$ Pa at 100° C. for 3 hours. The drying chamber was then filled with hot, dry nitrogen having a water content of 5 ppm and a temperature of 85° C. The hot, dry air was retained in the drying chamber for 5 minutes before evacuating the drying chamber. This cycle was repeated 10 times.

E) Assembling of Pouch-type Battery

Pouch cells were assembled by packaging the dried electrode assembly in a case made of an aluminum-plastic laminated film. An electrolyte was then filled into the case holding the packed electrodes in high-purity argon atmosphere with moisture and oxygen content <1 ppm. The electrolyte was prepared by adding $LiPF_6$ in a solvent mixture of ethylene carbonate (EC), ethyl methyl carbonate (EMC) and dimethyl carbonate (DMC) in a volume ratio of 1:1:1 and adding diethylstilbestrol and vinylene carbonate as additives, where the concentration of $LiPF_6$ was 1.0 M. The amounts of diethylstilbestrol and vinylene carbonate added were respectively 0.5% and 1.5% by weight, based on total weight of the electrolyte. After electrolyte filling, the pouch cells were vacuum sealed and then mechanically pressed using a punch tooling with standard square shape.

The cells were tested galvanostatically at a current density of C/2 at 25° C. on a battery tester (BTS-5V20A, obtained from Neware Electronics Co. Ltd, China) between 3.0 V and 4.2 V. The average nominal capacity was about 12.5 Ah.

F) Assembling of Battery Module

A battery module was made up of 3 pouch cells connected in series. The interconnected battery cells were enclosed in a plastic housing, wherein the housing had a negative and a positive terminal protruding from said housing and exposed to the external environment. The cross-sectional area of each terminal was about 1.8 cm$^2$. The nominal voltage of the battery module was 12 V.

Example 6

Electrochemical Measurements

I) Nominal Capacity

The battery module prepared in Example 5 was tested at current density of C/2 at 25° C. on a battery tester (CT-4001-15V300A-NA, obtained from Neware Electronics Co. Ltd, China) between 9 V and 12.6 V. The nominal capacity was about 12.5 Ah.

II) Charging Capability at Room Temperature

The battery module was first fully charged to 12.6 V and then discharged to 9.0 V at C/2 at 25° C. The fully discharged battery module was charged to 12.6 V at a predetermined current density and its discharging capacity was measured using a battery tester at C/2 at 25° C. This procedure was repeated by charging the fully discharged battery module with various charging current densities until the maximum charging rate was identified. The maximum charging rate obtained was about 5.7 C.

III) Discharging Capability at Room Temperature

The determination of the discharging capacities of the battery module was carried out by comparing the discharging curves obtained by discharging the battery module at different current densities. The battery module was first fully discharged and then charged to 12.6 V at C/2 at 25° C. The fully charged battery module was discharged to 9.0 V at a predetermined current density at 25° C. and its discharging capacity was measured using a battery tester. This procedure was repeated by discharging the fully charged battery module with various discharging current densities until the continuous discharging rate and maximum pulse discharging rate were identified.

The continuous discharging rate of the battery module was 15.8 C. The maximum discharging rate of the battery module for a pulse discharge period of about 5 seconds was about 48.5 C. The volume of the battery module was about 2 L and the corresponding volumetric power density was about 1,185 W/L.

IV) Low Temperature Discharging Capability

The battery module was fully charged at C/2 at 25° C. The battery module was then placed in a temperature chamber (T-HWS-150U, Tianyi Instrument and Equipment Co. Ltd., Dongguan, China) and kept at −30° C. for 24 hours. The maximum discharging rate of the battery module was measured by discharging the module at different current densities to 9 V at −30° C. for a pulse discharge period of about 5 seconds using a battery tester (CT-4001-15V300A-NA, obtained from Neware Electronics Co. Ltd, China). The maximum discharging rate obtained was 9.7 C (121.3 A). The battery module disclosed herein shows significantly enhanced discharge characteristics at −30° C. and demonstrates sufficient power for starting an engine of the outdoor power equipment after low temperature storage. In addition, the rate capability and cyclability of the battery module at room temperature are not sacrificed.

V) Capacity Fading in Storage

The battery module was fully charged at C/2 at 25° C. The battery module was then placed in a temperature chamber (T-HWS-150U, Tianyi Instrument and Equipment Co. Ltd., Dongguan, China) and kept at 55° C. for 7 days. A 40% relative humidity was maintained in the chamber. Then the battery module was cooled down to about 25° C. and discharged at C/2 to a voltage of 9 V. The capacity was about 11.13 Ah and the capacity retention was about 89% of its initial capacity after storage for 7 days at 55° C. The battery module disclosed herein demonstrates sufficient power for starting an engine of the outdoor power equipment after high temperature storage.

The battery module was fully charged at C/2 at 25° C. The battery module was then placed in a temperature chamber and kept at 25° C. for 7 months. A 40% relative humidity was maintained in the chamber. Then the battery module was discharged to 9.0 V at C/2. The capacity was about 11.3 Ah and the capacity retention was about 90.4% of its initial capacity after storage for 7 months at 25° C. The battery module disclosed herein demonstrates sufficient power for starting an engine of the outdoor power equipment after a long period of non-use.

Example 7

A) Preparation of a Core-shell Cathode Material

The core of the core-shell cathode material was $Li_{1.01}Ni_{0.53}Mn_{0.30}Co_{0.17}O_2$ and was prepared by a co-precipitation method. The shell of the core-shell cathode material was $Li_{0.97}Ni_{0.5}Mn_{0.32}Co_{0.15}Al_{0.03}O_2$ and was prepared by forming a precipitate of $Al(OH)_3$ on the surface of the core to form a precursor, mixing the precursor with $Li_2CO_3$ (obtained from Tianqi Lithium, Shenzhen, China) to obtain a mixture, and calcinating the mixture at 900° C. The calcinated product was crushed by a jet mill (LNJ-6A, obtained from Mianyang Liuneng Powder Equipment Co., Ltd., Sichuan, China) for about 1 hour, followed by passing the crushed product through a 270-mesh sieve to obtain a cathode material having a particle size D50 of about 38 μm. The content of aluminium in the core-shell cathode material gradiently decreases from the outer surface of the shell to the inner core. The thickness of the shell is about 3 μm.

B) Preparation of Positive Electrode

A positive electrode slurry was prepared by mixing 88 wt. % core-shell cathode material prepared above, 6 wt. % carbon black (SuperP; obtained from Timcal Ltd, Bodio, Switzerland) as a conductive agent, and 6 wt. % polyacrylonitrile (LA 132, Chengdu Indigo Power Sources Co., Ltd., China) as a binder, which were dispersed in deionized water to form a slurry with a solid content of 50 wt. %. The slurry was homogenized by a planetary stirring mixer.

The homogenized slurry was coated onto both sides of an aluminum foil having a thickness of 20 μm using a transfer coater with an area density of about 40 mg/cm². The coated films on the aluminum foil were dried for 5.5 minutes by a 24-meter-long conveyor hot air drying oven as a sub-module of the transfer coater operated at a conveyor speed of about 4.4 meter/minute to obtain a positive electrode. The temperature-programmed oven allowed a controllable temperature gradient in which the temperature gradually rose from the inlet temperature of 70° C. to the outlet temperature of 85° C. The electrode was then pressed to increase the density of the coating and the density was about 3 g/cm³.

C) Preparation of Negative Electrode

A negative electrode slurry was prepared by mixing 90 wt. % of hard carbon (HC; purity of 99.5%, obtained from Ruifute Technology Ltd., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent, which were dispersed in deionized water to form another slurry with a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minutes by a 24-meter-long conveyor hot air dryer operated at a conveyor speed of about 10 meter/minute to obtain a negative electrode. The electrode was then pressed to increase the density of the coating and the density was 1.8 g/cm$^3$.

D) Assembling of Electrode Assembly

The resulting cathode film and anode film were used to prepare the cathode and anode respectively by cutting into individual electrode plates. A conductive tab made of aluminum having a width of 4.5 cm, a length of 2 cm, and a thickness of 0.5 mm was ultrasonically welded to the uncoated portion of the positive electrode. Similarly, a conductive tab made of nickel having the same size as the conductive tab for the positive electrode was ultrasonically welded to the uncoated portion of the negative electrode. The above positive and negative electrode plates were alternately stacked via separators. The positive electrode plates (26 sheets), the negative electrode plates (27 sheets), and the continuous separator sheet were stacked to construct an electrode assembly. The separator was a ceramic coated PET microporous separator (obtained from MITSUBISHI PAPER MILLS LTD, Japan), which had a thickness of about 30 μm. The electrode assembly was dried in a vacuum oven inside a glove box under a pressure of 9×10$^3$ Pa at 100° C. for 6 hours. The drying chamber was then filled with hot, dry nitrogen having a water content of 5 ppm and a temperature of 85° C. The hot, dry air was retained in the drying chamber for 5 minutes before evacuating the drying chamber. This cycle was repeated 10 times.

E) Assembling of Pouch-type Battery

Pouch cells were assembled by packaging the dried electrode assembly in a case made of an aluminum-plastic laminated film. An electrolyte was then filled into the case holding the packed electrodes in high-purity argon atmosphere with moisture and oxygen content <1 ppm. The electrolyte was prepared by adding LiPF$_6$ in a solvent mixture of ethylene carbonate (EC), ethyl methyl carbonate (EMC) and dimethyl carbonate (DMC) in a volume ratio of 1:1:1 and adding diethylstilbestrol and vinylene carbonate as additives, where the concentration of LiPF$_6$ was 1.0 M. The amounts of diethylstilbestrol and vinylene carbonate added were respectively 0.5% and 1.5% by weight, based on total weight of the electrolyte. After electrolyte filling, the pouch cells were vacuum sealed and then mechanically pressed using a punch tooling with standard square shape.

The cells were tested galvanostatically at a current density of C/2 at 25° C. on a battery tester (BTS-5V20A, obtained from Neware Electronics Co. Ltd, China) between 3.0 V and 4.2 V. The average nominal capacity was about 11.5 Ah.

F) Assembling of Battery Module

A battery module was made up of 3 pouch cells connected in series. The interconnected battery cells were enclosed in a plastic housing, wherein the housing had a negative and a positive terminal protruding from said housing and exposed to the external environment. The cross-sectional area of each terminal was about 2.4 cm$^2$. The nominal voltage of the battery module was 12 V.

Example 8

Electrochemical Measurements

I) Nominal Capacity

The battery module prepared in Example 7 was tested at current density of C/2 at 25° C. on a battery tester (CT-4001-15V300A-NA, obtained from Neware Electronics Co. Ltd, China) between 9 V and 12.6 V. The nominal capacity was about 11.5 Ah.

II) Charging Capability at Room Temperature

The battery module was first fully charged to 12.6 V and then discharged to 9.0 V at C/2 at 25° C. The fully discharged battery module was charged to 12.6 V at a predetermined current density and its discharging capacity was measured using a battery tester at C/2 at 25° C. This procedure was repeated by charging the fully discharged battery module with various charging current densities until the maximum charging rate was identified. The maximum charging rate obtained was about 5.1 C.

III) Discharging Capability at Room Temperature

The determination of the discharging capacities of the battery module was carried out by comparing the discharging curves obtained by discharging the battery module at different current densities. The battery module was first fully discharged and then charged to 12.6 V at C/2 at 25° C. The fully charged battery module was discharged to 9.0 V at a predetermined current density at 25° C. and its discharging capacity was measured using a battery tester. This procedure was repeated by discharging the fully charged battery module with various discharging current densities until the continuous discharging rate and maximum pulse discharging rate were identified.

The continuous discharging rate of the battery module was 13 C. The maximum discharging rate of the battery module for a pulse discharge period of about 5 seconds was about 51.3 C. The volume of the battery module was about 2 L and the corresponding volumetric power density was about 945 W/L.

IV) Low Temperature Discharging Capability

The battery module was fully charged at C/2 at 25° C. The battery module was then placed in a temperature chamber (T-HWS-150U, Tianyi Instrument and Equipment Co. Ltd., Dongguan, China) and kept at −30° C. for 24 hours. The maximum discharging rate of the battery module was measured by discharging the module at different current density to 9 V at −30° C. for a pulse discharge period of about 5 seconds using a battery tester (CT-4001-15V300A-NA, obtained from Neware Electronics Co. Ltd, China). The maximum discharging rate obtained was 8.2 C (~94.4 A). The battery module disclosed herein shows significantly enhanced discharge characteristics at −30° C. and demonstrates sufficient power for starting an engine of the outdoor power equipment after low temperature storage. In addition, the rate capability and cyclability of the battery module at room temperature are not sacrificed.

V) Capacity Fading in Storage

The battery module was fully charged at C/2 at 25° C. The battery module was then placed in a temperature chamber (T-HWS-150U, Tianyi Instrument and Equipment Co. Ltd., Dongguan, China) and kept at 55° C. for 7 days. A 40% relative humidity was maintained in the chamber. Then the battery module was cooled down to about 25° C. and discharged to 9 V at C/2. The capacity was about 8.21 Ah and the capacity retention was about 83% of its initial capacity after storage for 7 days at 55° C. The battery module disclosed herein demonstrates sufficient power for starting an engine of the outdoor power equipment after high temperature storage.

While the invention has been described with respect to a limited number of embodiments, the specific features of one embodiment should not be attributed to other embodiments of the invention. Variations and modifications from the described embodiments exist. The appended claims intend to cover all those modifications and variations as falling within the scope of the invention.

What is claimed is:

1. A battery module for starting engine of power equipment comprising:
   a plurality of interconnected lithium-ion battery cells; wherein each of the lithium-ion battery cells independently comprises a cathode, an anode, a separator interposed between the cathode and anode, and an electrolyte; wherein the cathode comprises a cathode current collector and a cathode electrode layer comprising a cathode material, a binder material and a conductive agent, and the anode comprises an anode current collector and an anode electrode layer comprising an anode material, a binder material and a conductive agent;
   wherein the cathode material comprises or is a core-shell composite having a core and shell structure, wherein the core comprises a lithium transition metal oxide selected from the group consisting of $LiMn_2O_4$, $Li_{1+z}Ni_xMn_yCo_{1-x-y}O_2$, $LiNi_xCo_yAl_zO_2$, and combinations thereof, wherein each x is independently from 0.3 to 0.8; each y is independently from 0 to 0.45; and each z is independently from 0 to 0.2; wherein the shell comprises a lithium transition metal oxide selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiMnO_2$, $LiMn_2O_4$, and combinations thereof, wherein each x is independently from 0.3 to 0.8; each y is independently from 0.1 to 0.45; and each z is independently from 0 to 0.2;
   wherein the electrolyte comprises an organic solvent, a lithium salt, and an additive selected from the group consisting of diethylstilbestrol, butanesultone, vinylene carbonate, dimethyl sulfide, and combinations thereof; and
   wherein the amount of the additive is from 0.1% to 2% by weight, based on the total weight of the electrolyte.

2. The battery module of claim 1, wherein the diameter of the core is from about 5 μm to about 45 μm and the thickness of the shell is from about 3 μm to about 15 μm.

3. The battery module of claim 2, wherein the ratio of the diameter of the core to the thickness of the shell is from 5.7 to 12.6.

4. The battery module of claim 1, wherein the lithium transition metal oxide in the core is doped with a doping element selected from the group consisting of Fe, Ni, Mn, Al, Mg, Zn, Ti, La, Ce, Sn, Zr, Ru, Si, Ge, and combinations thereof.

5. The battery module of claim 1, wherein the lithium transition metal oxide in the shell is doped with a doping element selected from the group consisting of Fe, Ni, Mn, Al, Mg, Zn, Ti, La, Ce, Sn, Zr, Ru, Si, Ge, and combinations thereof.

6. The battery module of claim 5, wherein the doping element is Al.

7. The battery module of claim 5, wherein the doping element is present in an amount less than 2% by weight, based on the total weight of the cathode electrode layer.

8. The battery module of claim 5, wherein the content of the doping element gradiently decreases from the outer surface of the shell to the inner core.

9. The battery module of claim 1, wherein each of the core and shell independently comprises two or more lithium transition metal oxides.

10. The battery module of claim 9, wherein the two or more lithium transition metal oxides in the core and shell are different.

11. The battery module of claim 9, wherein the two or more lithium transition metal oxides are not uniformly distributed over the core.

12. The battery module of claim 1, wherein the cathode material has a particle size D50 from about 10 μm to about 50 μm.

13. The battery module of claim 1, wherein the conductive agent of the cathode electrode layer comprises carbon nanotube and graphene.

14. The battery module of claim 1, wherein the amount of each of the cathode and anode materials is independently between 80% and 95% by weight, based on the total weight of the cathode electrode layer or anode electrode layer, and wherein the amount of each of the conductive agents and binder materials in the cathode and anode electrode layers is independently from about 3% to about 10% by weight, based on the total weight of the cathode electrode layer or anode electrode layer.

15. The battery module of claim 1, wherein the density of each of the cathode and anode electrode layers is independently from about 1.0 $g/cm^3$ to about 6.5 $g/cm^3$.

16. The battery module of claim 1, wherein the additive is diethylstilbestrol and vinylene carbonate.

17. The battery module of claim 16, wherein the amounts of diethylstilbestrol and vinylene carbonate are respectively 0.5% and 1.5% by weight, based on the total weight of the electrolyte.

18. The battery module of claim 1, wherein the separator has a melting point of 200° C. or higher.

19. The battery module of claim 1, wherein the separator comprises a porous base material and a protective porous layer coated on one or both surfaces of the porous base material, and wherein the protective porous layer comprises a binder material and an inorganic filler selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2.

20. The battery module of claim 1, wherein each of the lithium-ion battery cells independently comprises a first conductive tab coupled to the cathode and a second conductive tab coupled to the anode, and wherein the width of each of the first and second conductive tabs is independently greater than 2 cm.

* * * * *